United States Patent Office 3,510,820
Patented May 5, 1970

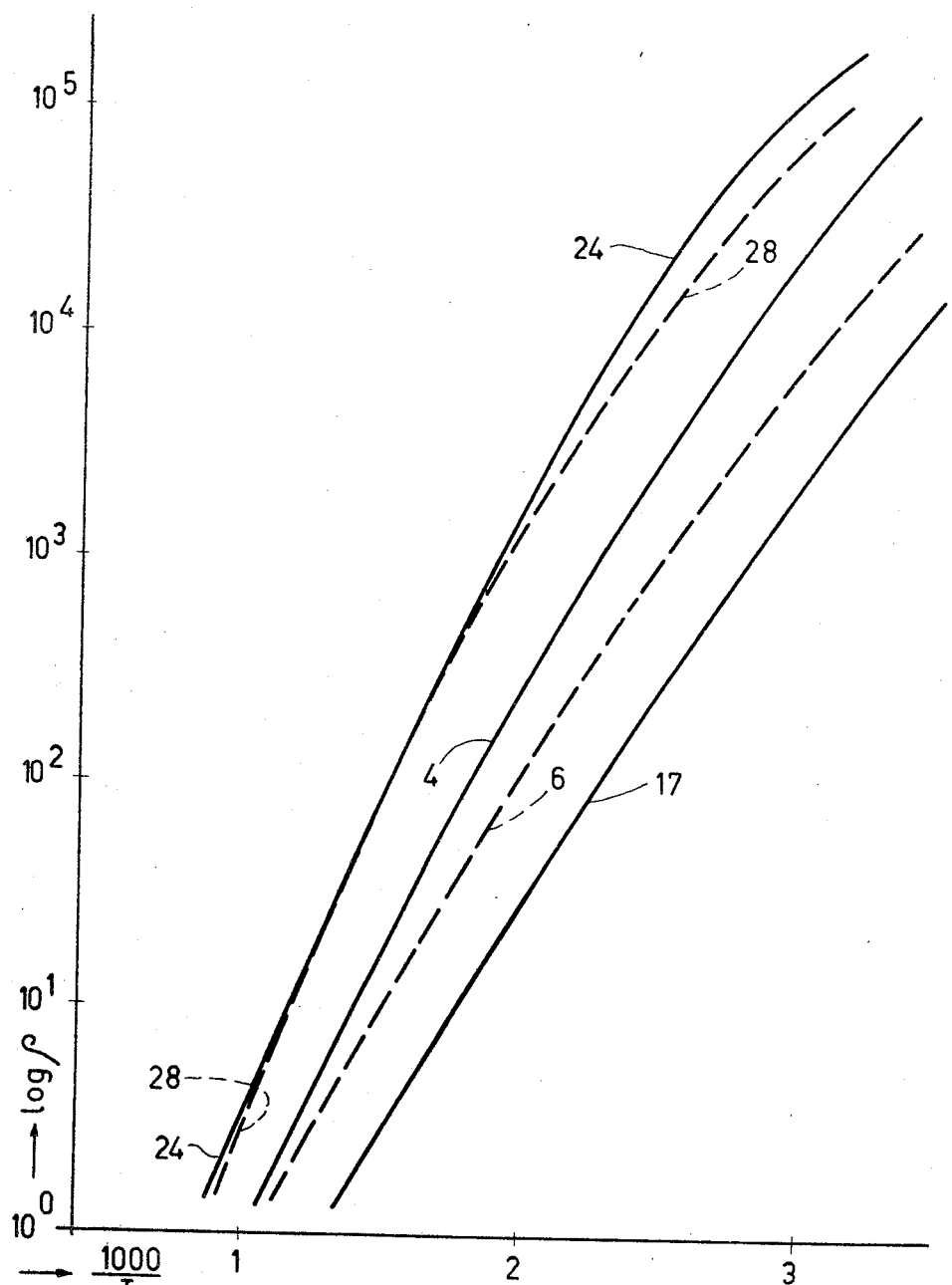

3,510,820
THERMISTOR
Gerard Heinrich Jonker and Willem Noorlander, Emmasingel, Eindhoven, Netherlands, assignors, by mesne assignments, to U.S. Philips Corporation, New York, N.Y., a corporation of Delaware
Filed Oct. 4, 1967, Ser. No. 672,810
Claims priority, application Netherlands, Oct. 5, 1966, 6614015; Aug. 2, 1967, 6710691
Int. Cl. H01c 7/04
U.S. Cl. 338—22        4 Claims

ABSTRACT OF THE DISCLOSURE

Produce negative temperature coefficient resistor from p-type semi-conductor body of a solid solution of the oxides of manganese, iron and magnesium or cobalt oxide wherein part of the magnesium and cobalt oxide may be replaced by zinc oxide and nickel oxide. The oxides have the spinel structure. An example of such a composition is the sintered mixture of the oxides of the following metals values (in mol percent) Mn—35%, Co—25% and Fe—40%.

---

Figure 1:
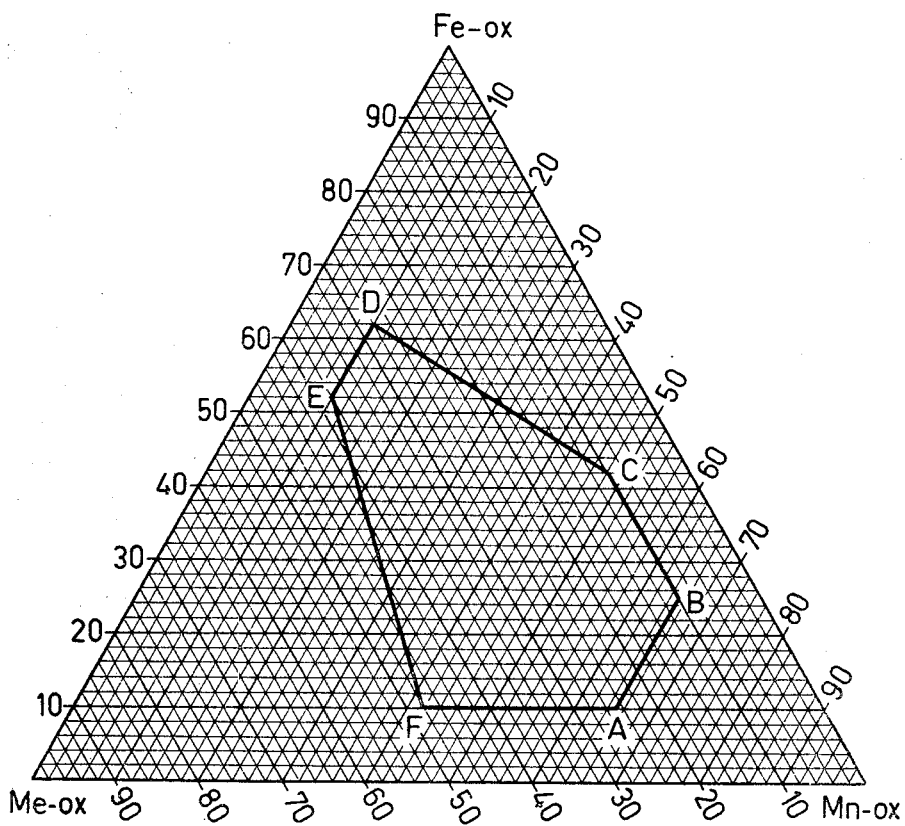

The invention relates to ceramic resistance bodies the electric resistance of which has a negative temperature coefficient (referred to hereinafter as ceramic n.t.c.-resistance bodies) and to thermistors manufactured therefrom (referred to hereinafter as n.t.c.-thermistors. A thermistor is to be understood to mean an electric resistor provided with electrodes having a temperature-dependent resistance.

N.t.c.-thermistors are known. The known n.t.c.-thermistors can be used for various purposes, for example, as starting resistors and control resistors, and, for example, for temperature measurement and control. However, the use of given n.t.c.-thermistors is limited in that they are hardly usable at temperatures above approximately 200° C., because the ceramic resistance bodies are not stable above said temperature under the operating conditions; this especially applies to the use in air. Other n.t.c.-thermistors, which do not or substantially not suffer from this limitation, have the disadvantage that above the said temperature, the temperature coefficient of the electric resistance is comparatively low or decreases excessively with increasing temperature.

In n.t.c.-thermistors according to the invention, these disadvantages are avoided. N.t.c.-thermistors according to the invention are distinguished by a very high temperature coefficient of the electric resistance, in that they are stable in air at high temperatures, even at temperatures of up to approximately 1000° C., and in that at high temperatures (200 to 1000° C.), the already high value of the semiconductor constant B (for the meaning of B cf. the formula below) of the electric resistance increases considerably with temperature.

For the ceramic semiconductor bodies of the type in accordance with the invention, the resistivity $\rho_T$ (in Ω.cm.) at a temperature T (in ° K.) can be represented in a given temperature range by the formula:

$$\rho_T = \rho_0 \cdot e^{\frac{B}{T}}$$

where B (in ° K.) and $\rho_0$ (in Ω.cm.) are specific semiconductor constants and e denotes the basic number of the natural logarithmic system. Since $$e/n\rho_T = \ln\rho_0 + \frac{B}{T}$$

and hence $$10 \log \rho_T = 10 \log \rho_0 + \frac{0.434 B}{T}$$

it is apparent that B is found to be the inclination of the curve which is obtained when $10 \log \rho$ is plotted against $1/T$.

For the temperature coefficient of the electric resistance (TC), it now follows:

$$TC = \frac{1}{\rho} \cdot \frac{d\rho}{dT} = -\frac{B}{T^2}$$

This means that in such semiconductors, the temperature coefficient (TC) rapidly decreases with increasing temperature. This effect is particularly strong in known ceramic semiconductors due to the fact that the semiconductor constant B decreases to zero with increasing temperature.

Since in the ceramic semiconductor bodies according to the invention, the quantity B already has a high value at approximately 100° C. and considerably increases with temperature, in this case the temperature coefficient decreases to a considerably lesser extent with increasing temperature than in the case of the known thermistors. This is a surprise and affords the important advantage that also due to this fact, thermistors according to the invention can be used at considerably higher temperatures than the known thermistors.

The invention relates to a ceramic resistance body the electric resistance of which has a negative temperature coefficient (a ceramic n.t.c.-resistance body) and to an n.t.c.-thermistor manufactured therefrom and it is characterized in that the ceramic n.t.c.-resistance body is a ceramic semiconductor body of p-conductivity type and mainly consists of a solid solution with spinel structure of oxides of manganese and iron and one or more oxides of the group consisting of oxides of magnesium and cobalt whilst magnesium oxide may be replaced up to 50 mol percent by zinc oxide, nickel oxide or these two oxides and cobalt oxide may be replaced up to 50 mol percent by nickel oxide, the composition of the solid solution in the system manganese oxide—iron oxide—Me-oxide, where Me-oxide represents magnesium oxide or cobalt oxide or both these oxides, lying in a range of compositions which, in the system manganese oxide—iron oxide—Me-oxide considered to be ternary, is a hexagon, the angular point of which are given by the following compositions (the contents of the constituent oxides are given here and below in at. percent of the relevant metals): A—65 Mn, 10 Fe and 25 Me; B: 65 Mn, 25 Fe and 10 Me; C: 48 Mn, 42 Fe and 10 Me; D: 10 Mn, 62 Fe and 28 Me; E: 10 Mn, 52 Fe and 38 Me, and F: 42 Mn, 10 Fe and 48 Me.

In FIG. 1, the said range of compositions of resistance bodies in accordance with the invention is shown in the described system which is considered to be ternary.

Semiconductor bodies of p-conductivity type are characterized by a positive thermoelectric force.

For a large number of n.t.c.-thermistors according to the invention comprising ceramic resistance bodies of various compositions, the table indicates the values of the semiconductor constant B (in ° K.) at 100° C. and 800° C. and the resistivity (in Ω.cm.) at 25° C. and furthermore the compositions of the ceramic resistance bodies given by the contents of the metals in at. percent, sum of the contents of the metals=100 at. percent). In FIG. II, for Examples 7, 10, 14 and 18, log $\rho$ is plotted against $1000/T$. The inclination of a curve at given values of $1000/T$ provides the value of the semiconductor constant B at temperature T.

The ceramic resistance bodies can be manufactured by known methods. The starting material consists of the oxides of the metals or of compounds of the metals which pass into oxides upon heating. The oxides or compounds are mixed in the desired ratio, ground and subjected to a first thermal treatment at temperatures lying between 800 and 1200° C. The mass obtained is then ground whilst adding a solution or a suspension of an organic binder, for example, methyl cellulose. Subsequently, plates, rods or blocks are obtained, for example, by extrusion or moulding. A sintering process is then carried out by heating at temperatures lying between 1000 and 1400° C. in air.

In order to promote the sintering process, a so-called sintering agent, for example, copper oxide or vanadium oxide, may be added. A few percent of these sintering agents hardly influence the properties of the resistance bodies. The table states a few examples in which sintering agents are used. In Example 9, 2% by weight and in Example 10 4% by weight of CuO and in Example 11, 5% by weight of $V_2O_5$ is used as sintering agent.

Due to their high stability at high temperatures when exposed to air, n.t.c.-thermistors according to the invention are particularly suitable for use under such conditions, for example, as control resistors for electric furnaces and frying-pans.

With such uses, the electrodes should fulfill given requirements. When gold or platinum electrodes are used, no further precautions need to be taken; it is of advantage that these electrode materials are particularly suitable for use in p-type ceramic bodies of the type in accordance with the invention. When the electrode material used is silver, the resistance body and electrodes should be sealed from the air, for example, by a gas-tight glass envelope.

EXAMPLE

A mixture containing 30 mol percent MnO, 30 mol percent NiO and 40 mol percent FeO were sintered in an electrically heated oven at a temperature of about 900° C. during 3 hours in an atmosphere of air. After cooling the resultant product is ground. The powder thus obtained is suspended in an aqueous solution of 2% by weight of methyl cellulose upon addition of 2% by weight of CuO as a sintering agent. The paste as obtained is extruded to form strips. The strips are sintered by heating in an atmosphere of air at about 1200° C. during 90 minutes.

What we claim is:

1. A negative-temperature coefficient thermistor comprising a p-type semiconductor body consisting essentially of crystals having a spinel structure and a composition consisting essentially of a solid solution of oxides of manganese and iron and at least one oxide of a metal selected from the group consisting of magnesium and cobalt, up to 50% mol of the magnesium oxide being replaceable by at least one oxide selected from the group consisting of zinc oxide and nickel oxide and up to 50 mol percent of the cobalt oxide being replaceable by nickel oxide, the proportions of said iron oxide, manganese oxide and said other oxides being within the area ABCDEA of the drawing wherein Me-ox represents all of said oxides other than managanese oxide and iron oxide, and a pair of spaced electrical conductors in contact with said semiconductor body.

2. The thermistor of claim 1 wherein Me-ox represents an oxide selected from the group consisting of cobalt oxide, magnesium oxide and mixtures thereof.

3. The thermistor of claim 1 wherein Me-ox represents cobalt oxide and mixtures of cobalt oxide and up to 50 mol percent of the cobalt oxide of nickel oxide.

4. The thermistor of claim 1 wherein Me-ox represents a member selected from the group consisting of magnesium oxide, a mixture of magnesium oxide and up to 50 mol percent of zinc oxide, a mixture of magnesium oxide and up to 50 mol percent of nickel oxide and magnesium oxide and up to 50 mol percent of a mixture of nickel oxide and zinc oxide.

| Test No. | Mn | Ni | Co | Fe | Mg | ρ | B at 100° C. | B at 800° C. |
|---|---|---|---|---|---|---|---|---|
| 1 | 30 | 30 | | 40 | | $1.2 \cdot 10^6$ | 4,600 | 8,200 |
| 2 | 40 | 30 | | 30 | | $3.6 \cdot 10^5$ | 4,600 | 7,800 |
| 3 | 50 | 30 | | 20 | | $1.7 \cdot 10^5$ | 4,400 | 7,800 |
| 4 | 60 | 30 | | 10 | | $9.4 \cdot 10^4$ | 4,400 | 6,500 |
| 5 | 40 | 40 | | 20 | | $2.8 \cdot 10^4$ | 3,500 | 5,200 |
| 6 | 65 | 20 | | 15 | | $2.8 \cdot 10^4$ | 4,200 | 5,500 |
| 7 | 50 | 40 | | 10 | | $9.5 \cdot 10^3$ | 3,700 | 5,200 |
| 8 | 20 | 30 | | 50 | | $2.1 \cdot 10^5$ | 4,300 | 7,800 |
| 9 | 30 | 30 | | 40 | | $2.3 \cdot 10^4$ | 3,900 | 7,500 |
| 10 | 30 | 30 | | 40 | | $2.3 \cdot 10^6$ | 4,100 | 7,900 |
| 11 | 20 | | 30 | 50 | | $2.9 \cdot 10^6$ | 5,100 | 7,900 |
| 12 | 25 | 10 | 25 | 40 | | $9.9 \cdot 10^4$ | 4,400 | 7,000 |
| 13 | 35 | | 25 | 40 | | $8.0 \cdot 10^5$ | 4,200 | 6,300 |
| 14 | 25 | | 23 | 52 | | $2.9 \cdot 10^6$ | 5,300 | 7,200 |
| 15 | 33 | | 33 | 34 | | $3.9 \cdot 10^4$ | 4,400 | 7,200 |
| 16 | 25 | | 45 | 30 | | $4.9 \cdot 10^4$ | 4,200 | 5,800 |
| 17 | 45 | | 35 | 20 | | $9.4 \cdot 10^3$ | 4,100 | 4,600 |
| 18 | 45 | | 40 | 15 | | $5.5 \cdot 10^3$ | 4,200 | 4,600 |
| 19 | 20 | 15 | 15 | 50 | | $4.6 \cdot 10^5$ | 4,700 | 7,500 |
| 20 | 20 | | 30 | 50 | | $1.0 \cdot 10^5$ | 4,300 | 6,700 |
| 21 | 20 | | 40 | 40 | | $1.8 \cdot 10^5$ | 4,500 | 6,600 |
| 22 | 33 | | 33 | 17 | 17 | $4.4 \cdot 10^3$ | 3,700 | 4,800 |
| 23 | 20 | | | 50 | 20 | $3.1 \cdot 10^7$ | 5,200 | 9,600 |
| 24 | 40 | | | 30 | 30 | $2.6 \cdot 10^5$ | 3,500 | 6,800 |
| 25 | 55 | | | 25 | 20 | $9.0 \cdot 10^3$ | 6,300 | 7,800 |
| 26 | 40 | | | 15 | 45 | $1.3 \cdot 10^5$ | 3,800 | 5,600 |
| 27 | 40 | 20 | | 20 | 20 | $5.5 \cdot 10^4$ | 3,800 | 5,700 |
| 28 | 30 | 15 | | 40 | 15 | $1.8 \cdot 10^5$ | 2,800 | 7,100 |
| 29 | 25 | 12 | | 50 | 13 | $4.5 \cdot 10^7$ | 5,600 | 8,600 |

References Cited

UNITED STATES PATENTS 2,258,646   10/1941   Grisdale _____ 252—519

FOREIGN PATENTS 684,547   12/1952   Great Britain.

DOUGLAS J. DRUMMOND, Primary Examiner

U.S. Cl. X.R.

252—519, 521; 338—25